US010895947B2

(12) United States Patent
Bostic et al.

(10) Patent No.: US 10,895,947 B2
(45) Date of Patent: *Jan. 19, 2021

(54) SYSTEM-WIDE TOPOLOGY AND PERFORMANCE MONITORING GUI TOOL WITH PER-PARTITION VIEWS

(71) Applicant: International Business Machines Corporation, Armonk, NY (US)

(72) Inventors: William A Bostic, Jonestown, TX (US); Randall R. Heisch, Georgetown, TX (US); Venkat R. Indukuru, Austin, TX (US); Allan E. Johnson, Mantorville, MN (US); Jesse L. Sathre, Rochester, MN (US); Philip L. Vitale, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 16/208,044

(22) Filed: Dec. 3, 2018

(65) Prior Publication Data

US 2019/0114035 A1 Apr. 18, 2019

Related U.S. Application Data

(63) Continuation of application No. 15/075,325, filed on Mar. 21, 2016, now Pat. No. 1,014,396, which is a
(Continued)

(51) Int. Cl.
*G06F 3/0481* (2013.01)
*G06F 11/32* (2006.01)
(Continued)

(52) U.S. Cl.
CPC ........ *G06F 3/0481* (2013.01); *G06F 3/04842* (2013.01); *G06F 11/3048* (2013.01); *G06F 11/323* (2013.01); *G06F 11/3409* (2013.01); *G06F 11/3055* (2013.01); *G06F 11/3495* (2013.01); *G06F 2201/815* (2013.01)

(58) Field of Classification Search
None
See application file for complete search history.

(56) References Cited

U.S. PATENT DOCUMENTS 6,611,276 B1 8/2003 Muratori et al.
6,901,582 B1 5/2005 Harrison
(Continued)

OTHER PUBLICATIONS

List of IBM Patents or Patent Applications Treated as Related, Dec. 3, 2018, 2 pages.
(Continued)

*Primary Examiner* — Ryan F Pitaro
(74) *Attorney, Agent, or Firm* — Stephen R. Tkacs; Stephen J. Walden, Jr.; Thomas E. Tyson

(57) ABSTRACT

Mechanisms are provided for a graphical user interface tool for system-wide topology and performance monitoring with per-partition views. A graphical user interface application presents a consolidated view of physical and logical information based on the received performance data. The mechanisms provide real-time performance and utilization information in a visual format relative to the physical components in a topographical layout. The user may drill down to lower levels to view more detailed performance and utilization information.

20 Claims, 10 Drawing Sheets

Related U.S. Application Data continuation of application No. 13/325,253, filed on Dec. 14, 2011, now Pat. No. 9,292,403.

(51) Int. Cl.
*G06F 3/0484* (2013.01)
*G06F 11/34* (2006.01)
*G06F 11/30* (2006.01)

(56) References Cited

U.S. PATENT DOCUMENTS

| | | | |
|---|---|---|---|
| 7,117,499 | B2 | 10/2006 | Kawamoto et al. |
| 7,136,778 | B2 | 11/2006 | Duron et al. |
| 8,175,863 | B1 | 5/2012 | Ostermeyer et al. |
| 8,707,194 | B1 | 4/2014 | Jenkins et al. |
| 8,806,486 | B2 | 8/2014 | Martin et al. |
| 2002/0173863 | A1 | 11/2002 | Imada et al. |
| 2003/0171907 | A1 | 9/2003 | Gal-On et al. |
| 2006/0149985 | A1 | 7/2006 | Dubinsky |
| 2007/0143686 | A1 | 6/2007 | Branson et al. |
| 2007/0266136 | A1 | 11/2007 | Esfahany et al. |
| 2007/0294557 | A1 | 12/2007 | Dubinsky |
| 2008/0222632 | A1 | 9/2008 | Ueno et al. |
| 2009/0172666 | A1 | 7/2009 | Yahalom et al. |
| 2010/0218018 | A1 | 8/2010 | Parker, Jr. et al. |
| 2011/0161851 | A1 | 6/2011 | Barber et al. |
| 2012/0030346 | A1 | 2/2012 | Fukuda et al. |
| 2012/0054331 | A1 | 3/2012 | Dagan |
| 2012/0137295 | A1 | 5/2012 | Soetemans et al. |
| 2012/0260181 | A1 | 10/2012 | Sule et al. |
| 2012/0284712 | A1 | 11/2012 | Nimmagadda et al. |
| 2012/0311475 | A1 | 12/2012 | Wong |

OTHER PUBLICATIONS

"IBM Tivoli Monitoring V6.2.2: CEC Base Agent V6.2.1", IBM Corporation, User's Guide, 2008-2009, 110 pages.

Devenish, Stuart et al., "IBM PowerVM Virtualization Introduction and Configuration", IBM Corporation; http://www.redbooks.ibm.com/redbooks/pdfs/sg247940.pdf; Jun. 2011, 600 pages.

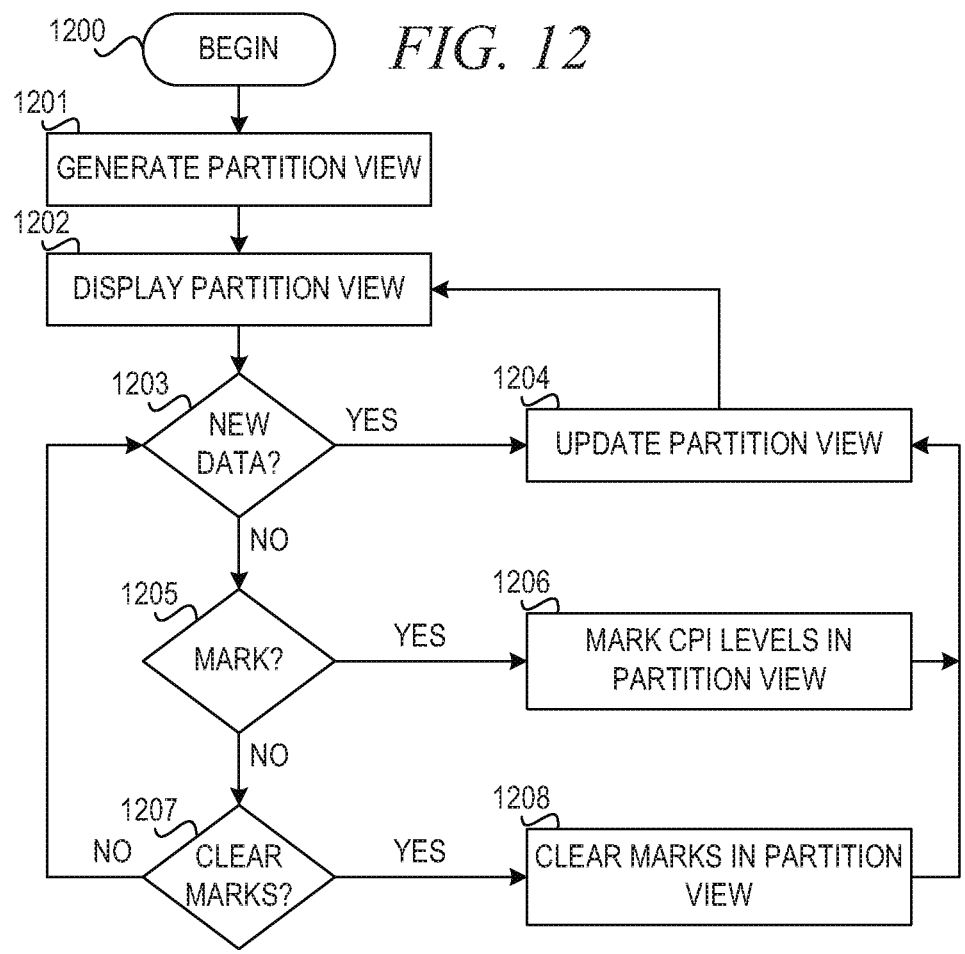

SYSTEM-WIDE TOPOLOGY AND PERFORMANCE MONITORING GUI TOOL WITH PER-PARTITION VIEWS

BACKGROUND

The present application relates generally to an improved data processing apparatus and method and more specifically to mechanisms for providing a graphical user interface tool for system-wide topology and performance monitoring with per-partition views.

A logical partition, commonly called an LPAR, is a subset of computer's hardware resources, virtualized as a separate computer. In effect, a physical machine can be partitioned into multiple logical partitions, each hosting a separate operating system instance. A hypervisor, also referred to as a virtual machine manager (VMM), is one of many hardware virtualization techniques that allow multiple operating systems to run concurrently on a host computer. The hypervisor presents to the operating systems a virtual operating platform and manages execution of the operating systems. Multiple instances of a variety of operating systems may share the virtualized hardware resources. Hypervisors are installed on server hardware whose only task is to run operating systems in LPARs.

In a large virtualized machine environment, many tools exist for performance monitoring. These tools monitor performance on a physical level or a logical level. Each tool generates data that can be viewed in a user interface resulting in multiple disparate output displays.

SUMMARY

In one illustrative embodiment, a method, in a data processing system, is provided for performance monitoring. The method comprises receiving performance and utilization data from a system-wide monitor for a central electronics complex and a plurality of per-partition monitors within a plurality of logical partitions executing within the central electronics complex. The method further comprises generating a graphical user interface comprising a logical display portion and a physical display portion. The logical display portion consolidates a visual representation of logical partition data and a visual representation of physical resource utilization data from the performance and utilization data for each of the plurality of logical partitions. The physical display portion consolidates a physical topology representation of at least a portion of the central electronics complex and a visual representation of physical resource utilization data by the plurality of logical partitions. The method further comprises presenting the graphical user interface on a presentation device of the data processing system.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 12 is a flowchart illustrating operation of a performance monitoring graphical user interface mechanism for presenting a partition view in accordance with an illustrative embodiment.

DETAILED DESCRIPTION

The illustrative embodiments provide a mechanism for providing a graphical user interface tool for system-wide topology and performance monitoring with per-partition views. A system-wide performance monitor collects performance data from components of a system. The system-wide performance monitor may collect data from existing tools that measure chip utilization, core utilization, bus utilization, memory utilization, etc. The system-wide performance monitor gathers performance data and topology for the entire system, or central electronics complex (CEC). A per-partition monitor may exist in each partition to collect data for its partition. Each per-partition monitor may collect data from existing tools that monitor state, cores assigned, cores entitled, central processing unit (CPU) utilization, etc. The system-wide performance monitor may double as a per-partition monitor for the partition in which it executes. A graphical user interface application receives data collected by the system-wide performance monitor and the per-partition monitors. The graphical user interface application may then present a consolidated view of physical and logical information based on the received performance data.

Figure 1:
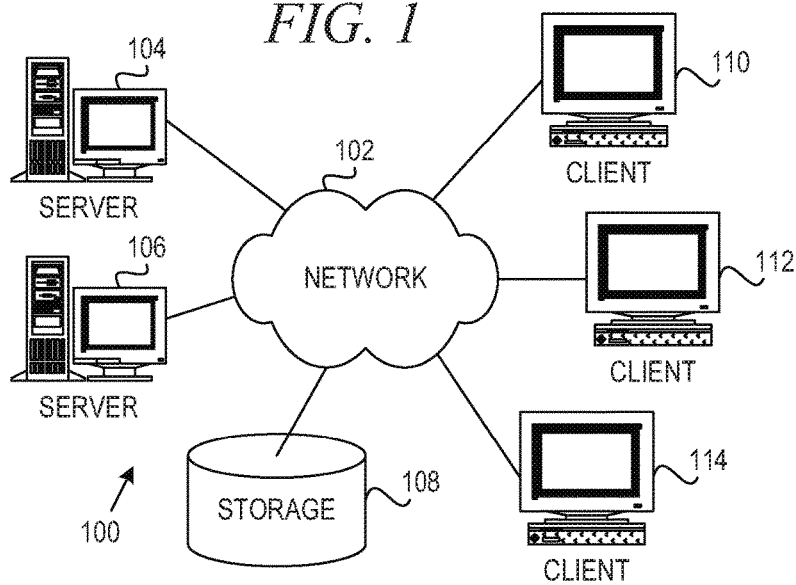
FIG. 1 depicts a pictorial representation of an example distributed data processing system in which aspects of the illustrative embodiments may be implemented.
Figure 2:
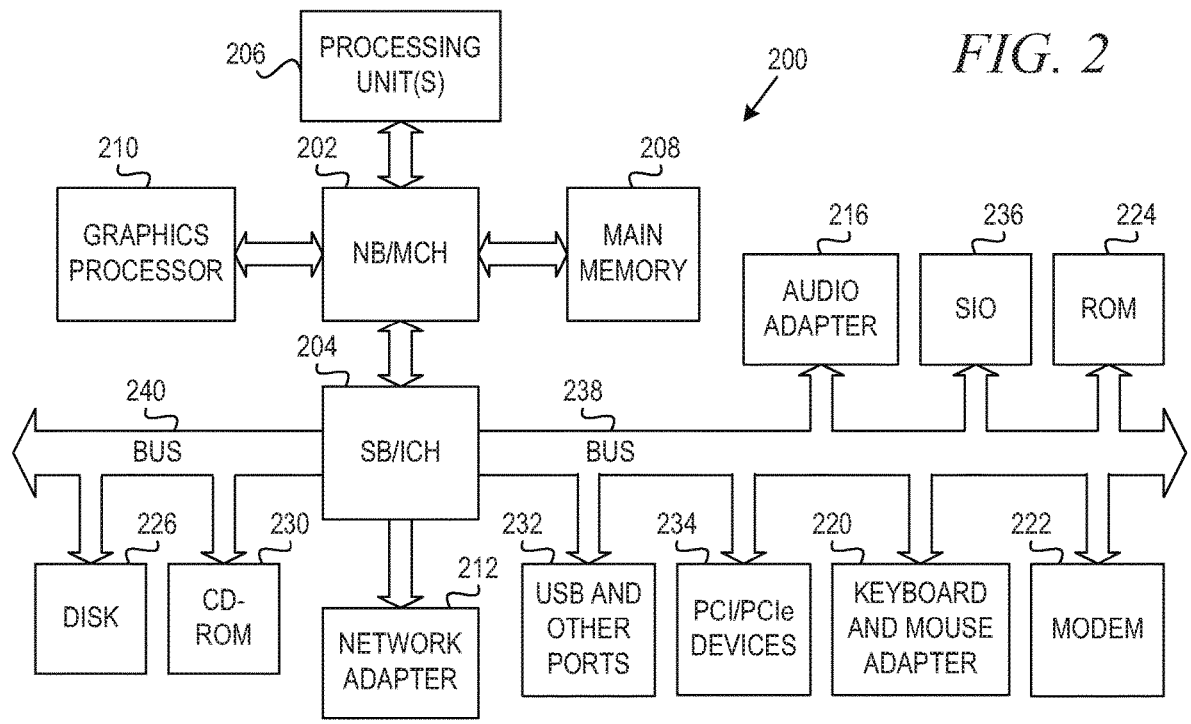
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Figure 3A:
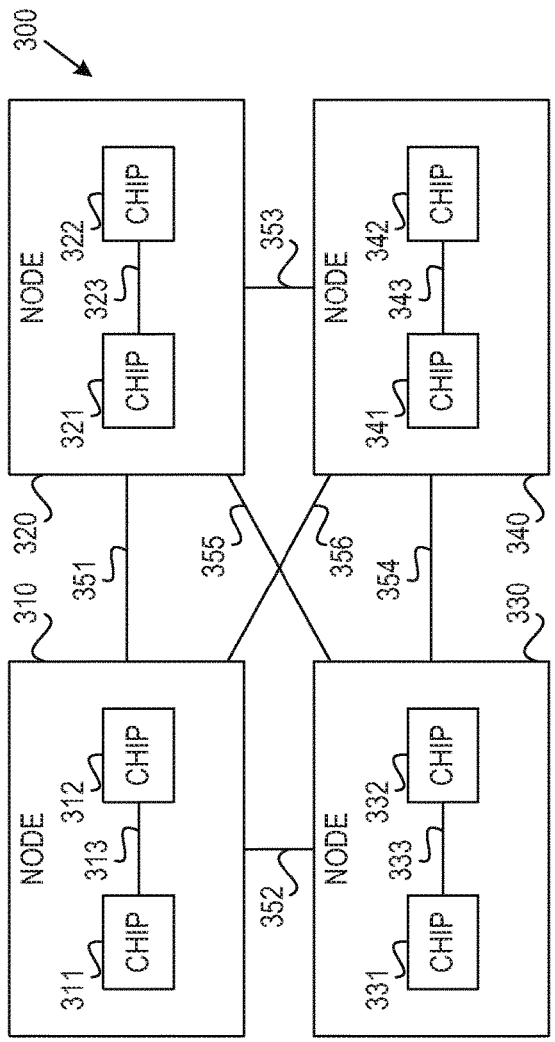
FIG. 3A is a block diagram of an example central electronics complex in which aspects of the illustrative embodiments may be implemented.

FIG. 3A is a block diagram of an example central electronics complex in which aspects of the illustrative embodiments may be implemented. Central electronics complex 300 is an example of a computer, such as server 104 in FIG. 1, in which computer usable code or instructions implementing the processes for illustrative embodiments of the present invention may be located. Central electronics complex (CEC) 300 comprises a plurality of nodes 310, 320, 330, 340 connected by buses 351-356. For example, node 310 connects to node 320 via bus 351; node 310 connects to node 330 via bus 352; node 320 connects to node 340 via bus 353; node 330 connects to node 340 via bus 354; node 320 connects to node 330 via bus 355; and, node 310 connects to node 340 via bus 356. While the example depicted in FIG. 3A shows four nodes where each node is connected to every other node, a person of ordinary skill in the art will recognize CEC 300 may comprises more or fewer nodes or may include more or fewer interconnecting buses depending upon the implementation.

Each node comprises a plurality of chips. For example, node 310 comprises chips 311, 312; node 320 comprises chips 321, 322; node 330 comprises chips 331, 332; node 340 comprises chips 341, 342. Chips within a node are connected via buses. For example, in node 310, chip 311 connects to chip 312 via bus 313; in node 320, chip 321 connects to chip 322 via bus 323; in node 330, chip 331 connects to chip 332 via bus 333; and, in node 340, chip 341 connects to chip 342 via bus 343. While the example depicted in FIG. 3A shows two chips in a node, a person of ordinary skill in the art will recognize a node may comprise more or fewer chips depending upon the implementation.

Figure 3B:
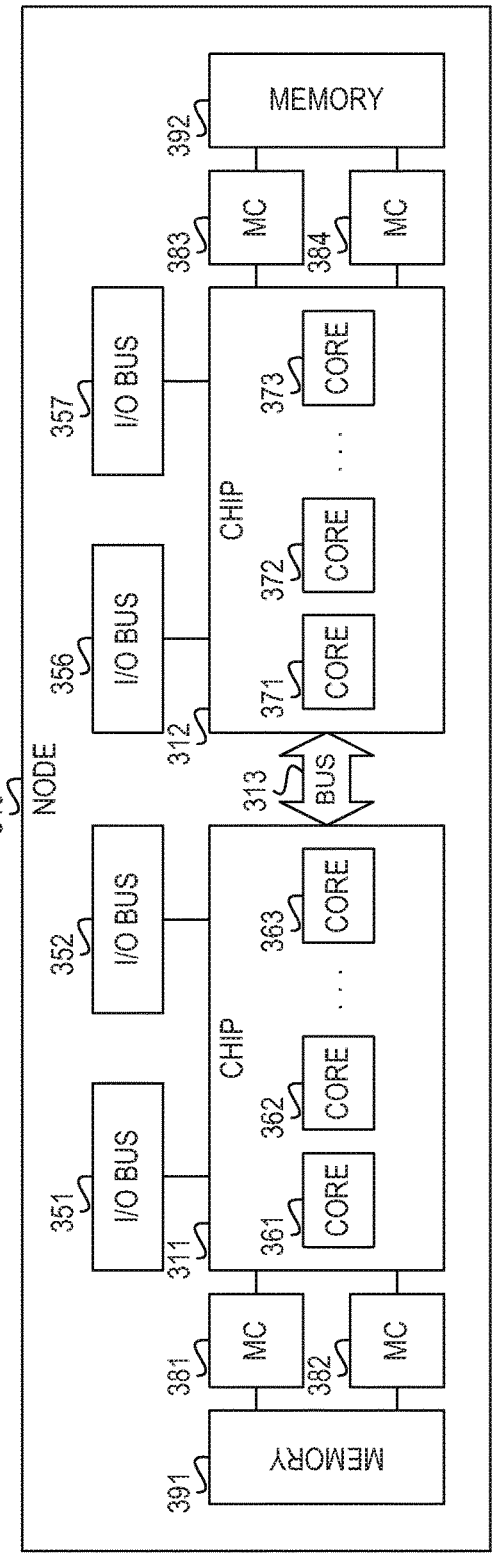
FIG. 3B is a block diagram of an example node in which aspects of the illustrative embodiments may be implemented.

FIG. 3B is a block diagram of an example node in which aspects of the illustrative embodiments may be implemented. Node 310 comprises chips 311, 312, I/O buses 351, 352, 356, 357, memory controllers 381-384, and memories 391, 392. Chip 311 comprises cores 361-363, and chip 312 comprises cores 371-373. In accordance with one example embodiment, which is a typical configuration, chips 311, 312 may comprise eight cores, although chips 311, 312 may include any number of cores, such as two, four, sixteen, or even more.

Chip 311 connects to chip 312 via bus 313. Chip 311 connects to memory 391 via memory controllers (MCs) 381, 382, and chip 312 connects to memory 392 via MCs 383, 384. Chip 311 connects to I/O buses 351, 352, and chip 312 connects to I/O buses 356, 357.

Those of ordinary skill in the art will appreciate that the hardware in FIGS. 1-3 may vary depending on the implementation. Other internal hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Logical partitioning (LPAR) is the ability to make a server run as if it were two or more independent servers. When one logically partitions a server, one divides the resources on the server into subsets called logical partitions. Processors, memory, and input/output devices are examples of resources that can be assigned to logical partitions. A logical partition runs as an independent logical server with the processor, memory, and I/O resources allocated to it. Examples of the kinds of software that can be installed and run on logical partitions include the AIX®, i5/OS™, and Linux® operating systems and Virtual I/O Server software. "AIX" and "i5/OS" are trademarks of International Business Machines Corporation in the United States, other countries, or both. "LINUX" is a trademark of Linus Torvalds in the United States, other countries, or both.

A Hardware Management Console (HMC) is an example of a hardware appliance that connects to server firmware. The HMC may be used to specify to the server firmware how to allocate resources among the logical partitions on the managed system. The HMC may also be used to start and stop the logical partitions, update server firmware code, manage Capacity on Demand, and transmit service information to service and support if there are any hardware problems with the managed system. Server firmware is code that is stored in system flash memory on the server. Server firmware directly controls resource allocations on the server and communications between logical partitions on the server.

Although each logical partition acts as an independent server, the logical partitions on a physical server can share some kinds of resources with each other. The ability to share resources among many logical partitions allows increased resource utilization on the server by shifting the server resources to where they are needed.

A processor is a device that processes programmed instructions. The more processors assigned to a logical partition, the greater the number of concurrent operations the logical partition can run at any given time. Dedicated processors are whole processors that are assigned to a single partition. Shared processors are physical processors whose processing capacity is shared among multiple logical partitions.

The ability to divide physical processors and share them among multiple logical partitions is known as Micro-Partitioning™ or shared processor logical partitioning (SPL-PAR). Micro-Partitioning™ (or shared processing) allows logical partitions to share the processors in the shared processor pool. "MICRO-PARTITIONING" is a trademark of International Business Machines Corporation in the United States, other countries, or both. The shared processor pool includes all processors on the server that are not dedicated to specific logical partitions. Each logical partition that uses the shared processor pool is assigned a specific amount of processor power from the shared processor pool. If the logical partition needs more processor power than its assigned amount, the logical partition is set by default to use the unused processor power in the shared processor pool. The amount of processor power the logical partition can use is limited only by the virtual processor settings of the logical partition and the amount of unused processor power available in the shared processor pool.

In a given configuration, each LPAR may be entitled to a set number of processors. Server firmware, also referred to as the hypervisor or virtualization layer, may assign a number of processors to each LPAR based on resource management algorithms and LPAR workload. One may configure each LPAR to use dedicated processors or shared processors. LPARs may also use processors and other resources, such as memories and/or input/output buses, across the entire data processing system or CEC. Thus, from the perspective of the physical resources, the resources will see varying utilization depending upon allocation of resources to LPARs, workload of the LPARs, and so forth.

Tools exist for monitoring performance of resources in a data processing system or CEC. For example, tools exist for measuring processor utilization and performance, I/O bus utilization, etc. Each of these tools provides a separate output, and it may be difficult to glean any real meaning from just one of these output displays.

Figures 4, 5:
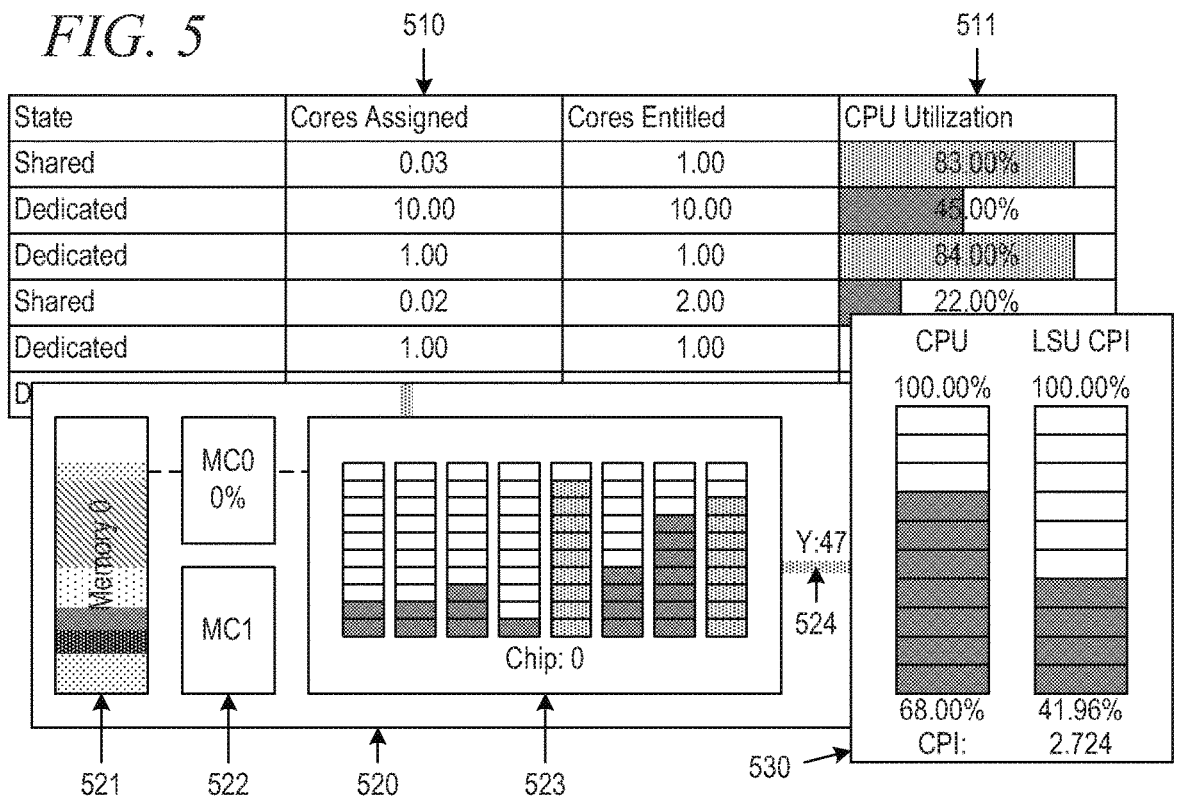
FIG. 4 illustrates a plurality of displays of output from performance monitoring tools that may be used by the illustrative embodiments.
FIG. 5 illustrates a plurality of display portions of output that combine physical and virtual environment monitoring in accordance with an illustrative embodiment.

FIG. 4 illustrates a plurality of displays of output from performance monitoring tools that may be used by the illustrative embodiments. Output display 410 collects and displays low-level CPU event counter information. Output display 420 displays high level partition data such CPU utilization. Output display 430 displays I/O-related data such as disk and network usage and traffic. Output display 440 displays information about how the partition is using CPU and memory resources.

In accordance with an illustrative embodiment, a real-time, network socket based, system-wide, and partition specific data collection system is provided. A dynamic graphical user interface (GUI) mechanism combines and visually displays system topology, including hardware bus interconnect information, bus performance utilization, per-partition hypervisor utilization and memory allocation, hypervisor logical processor dispatch trace data, processor (core) utilization, core allocation per partition with per-partition performance information monitoring, including real-time processor functional unit cycles per instruction (CPI) stack display. This system provides users, such as performance analysts and customers, with a unique view of both overall system, as well as per-partition, performance.

The system converges performance data from across the system and shows frame and partition level performance data and illustrates frame topology utilization through colorized "heat." The system maps partitions to physical resources, such as processor cores and memory. The system enables drill-down for both physical and logical approaches. The system allows real-time monitoring for immediate drill-down. The system logs data for later analysis and comparison. The system simplifies physical/virtual environment monitoring and analysis.

FIG. 5 illustrates a plurality of display portions of output that combine physical and virtual environment monitoring in accordance with an illustrative embodiment. Display 510 presents an example of a logical view of the logical partitions running on the system. Display 520 present an example of a physical view of the system with performance data embedded within a topographical view. Display 530 presents an example of a single partition view with cycles per instruction (CPI) data. In accordance with the illustrative embodiment, the system combines these views in a graphical user interface (GUI).

Display 510 presents logical partitions (LPARs) in a table format displaying a state of each LPAR (shared or dedicated), cores assigned, cores entitled, and CPU utilization 511. In display 510, CPU utilization 511 may be a real-time display. CPU utilization display portion 511 may shade or color the utilization based on whether utilization is high or low relative to one or more predetermined thresholds, presenting a relative "heat." Display 510 may update LPAR data periodically to present a real-time display.

Display 520 presents the physical view of the system, or in this instance one node, comprising a view of memory 521, memory controllers 522, chip 523, and bus 524. Memory display portion 521 represents a physical memory device and portrays percentages of memory utilization by the various LPARs in the system via different colors or shading. Memory controller display portions 522 represent physical memory controllers and portray memory utilization as a numeric percentage in the depicted example. Chip display portion 523 represents a physical chip with a plurality of processing cores. Chip display portion 523 portrays utilization by shading or coloring the percentage of the portion corresponding to measured utilization. Chip display portion may color or shade the utilization percentage differently based on whether utilization is high or low relative to one or more predetermined thresholds, presenting a relative "heat." Bus display portion 524 represents a physical bus between chips or an input/output bus between nodes. Bus display portion 524 portrays bus utilization as a numeric percentage. Bus display portion 524 may also color or shade the bus based on whether utilization is high or low relative to one or more predetermined thresholds, presenting a relative "heat." Display 520 may update utilization data in display portions 521-524 periodically to present a real-time display.

Display 530 presents a single partition view with cycles per instruction (CPI) data. In the depicted example, display 530 presents CPI as a percentage for the central processing unit (CPU) and load/store unit (LSU) by shading or coloring the corresponding portion. Display 530 may update the CPI percentages periodically to present a real-time display.

Figure 6:
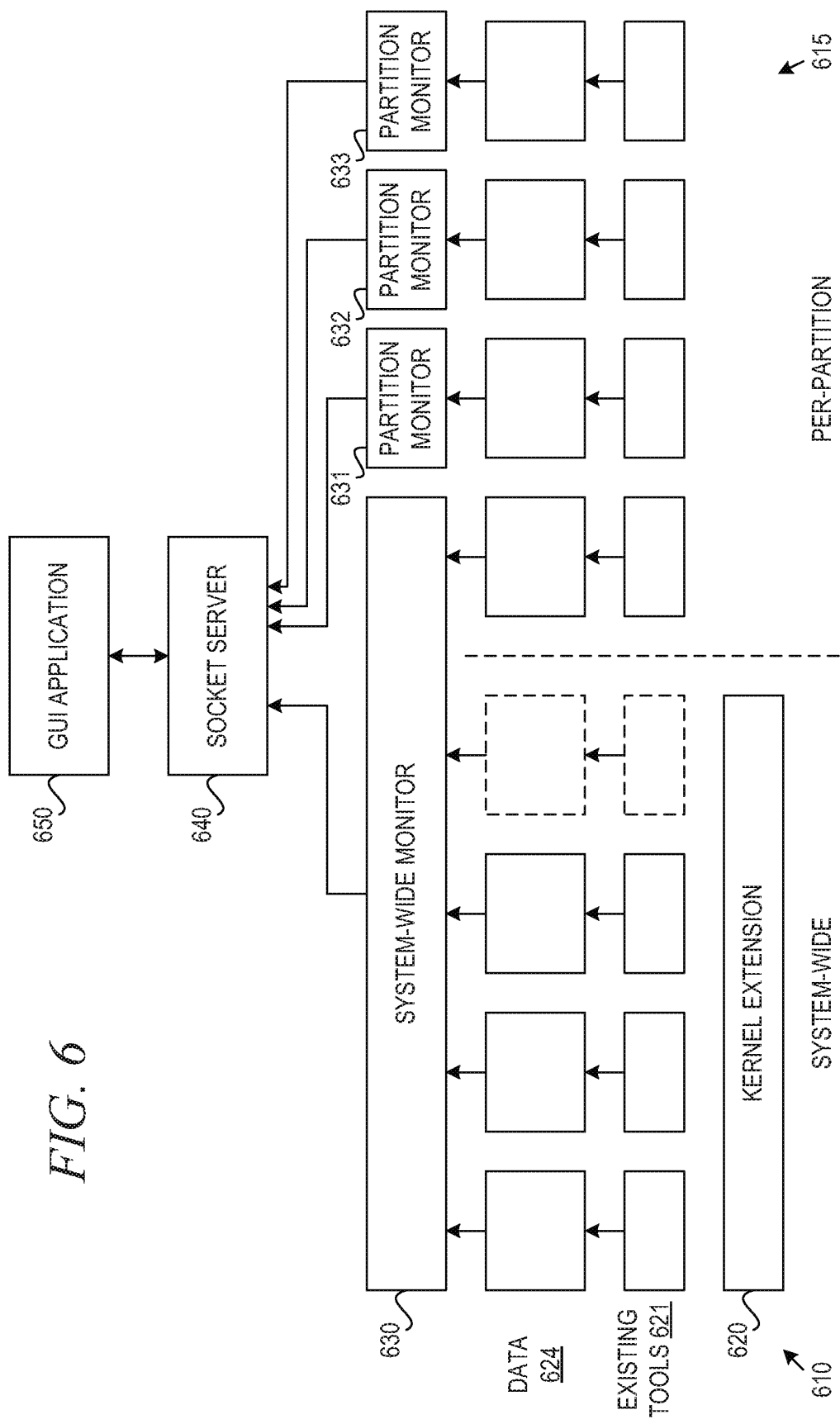
FIG. 6 is a block diagram illustrating a system for system-wide topology and performance monitoring with per-partition views in accordance with an illustrative embodiment.

FIG. 6 is a block diagram illustrating a system for system-wide topology and performance monitoring with per-partition views in accordance with an illustrative embodiment. The system comprises system-wide performance monitoring 610 and per-partition performance monitoring 615. In system-wide performance monitoring 610, existing tools for performance monitoring 621 run on top of a kernel extension 620 that provides a power hypervisor (PHYP) interface for collecting bus utilization, interconnect topology information, utilization data, etc. Tools 621 in system-wide monitoring generate data 624. System-wide monitor 630 receives data 624 from tools 621.

In per-partition performance monitoring 615, tools 621 are stat tools that generate logical partition (LPAR) performance data. System wide monitor 630 may double as a per-partition monitor on the LPAR on which it runs. System wide monitor 630 and per-partition monitors 631-633 receive data 624 from tools 621.

Graphical user interface (GUI) application 650 gathers performance data from system-wide monitor 630 and per-partition monitors 631-633 via socket server 640. GUI application 650 combines logical and physical views to present real-time views of physical topology and logical partitions.

Figure 7:
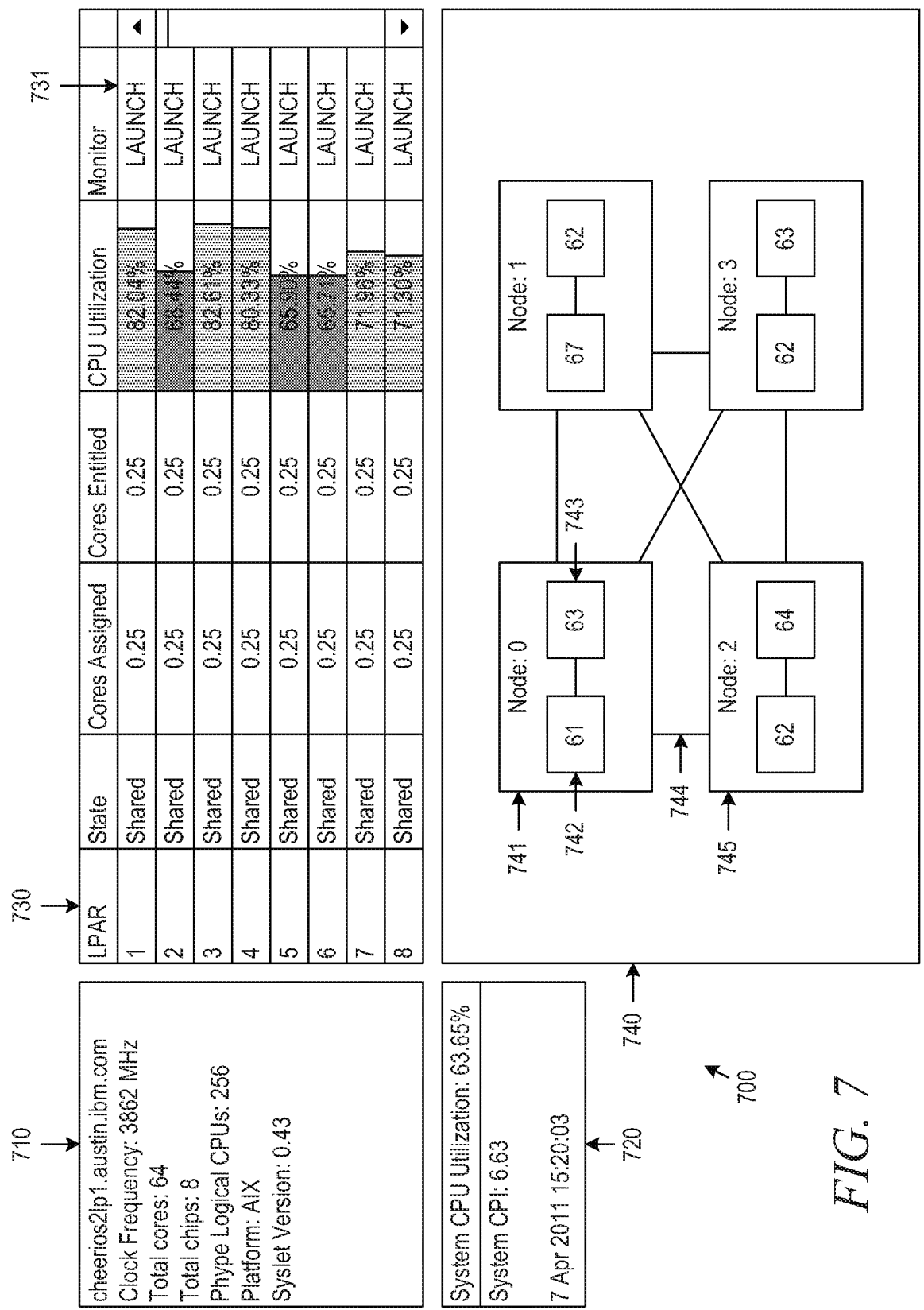
FIG. 7 depicts an example graphical user interface with a multi-node view in accordance with an illustrative embodiment.

FIG. 7 depicts an example graphical user interface with a multi-node view in accordance with an illustrative embodiment. Graphical user interface (GUI) display 700 comprises system information display portion 710, system utilization display portion 720, logical partition (LPAR) display portion 730, and physical topology display portion 740. System information display portion 710 presents information about the system, such as clock frequency, number of processing cores, number of chips, number of logical processors, etc. System utilization display portion 720 presents data about overall system utilization.

LPAR display portion 730 presents logical partitions (LPARs) in a table format. Logical partition display portion 730 displays for each LPAR allocated to the system an identifier of the LPAR, a state of the LPAR (shared or dedicated), a number of cores assigned to the LPAR, a number of cores entitled by the LPAR, real-time processor utilization of the LPAR, and a monitor launch control 731. Responsive to a user selecting a monitor launch control 731 for a given LPAR, the GUI application opens a single partition view, as will be described below.

Physical topology display portion 740 presents multiple nodes of the system in a topological format. Physical display portion 740 displays the multiple nodes and their interconnections, as well as the chips in each node. For instance, node 741 includes chips 742, 743 and is connected to node 745 via I/O bus 744. In the depicted example, chip 742 has 61% utilization, and chip 743 has 63% utilization.

In one example embodiment, in response to a user selecting an LPAR in LPAR display portion 730, the GUI application may highlight the node(s) or chip(s) in physical topology display portion 740 the LPAR uses. Similarly, in response to a user selecting a node or chip in physical topology display portion 740, the GUI application may highlight the LPAR(s) that use the selected node or chip in LPAR display portion 730. In addition, in response to the user launching a single node view, such as by double clicking a node, the GUI application may present a graphical user interface with a single node view. That is, the GUI application may allow the user to "drill-down" to various components in physical topology display portion 740.

The multiple node view may also show the links between nodes going from one chip in the node to one chip in the other node. The multiple node view may show what hops are made from one chip to another to get off the node and then to another chip on another node. For example, if a program running on node 741, chip 743 accesses memory on a chip in node 745, the multiple node view 740 may show the indirect hops required and the bus utilizations for each link.

Figure 8:
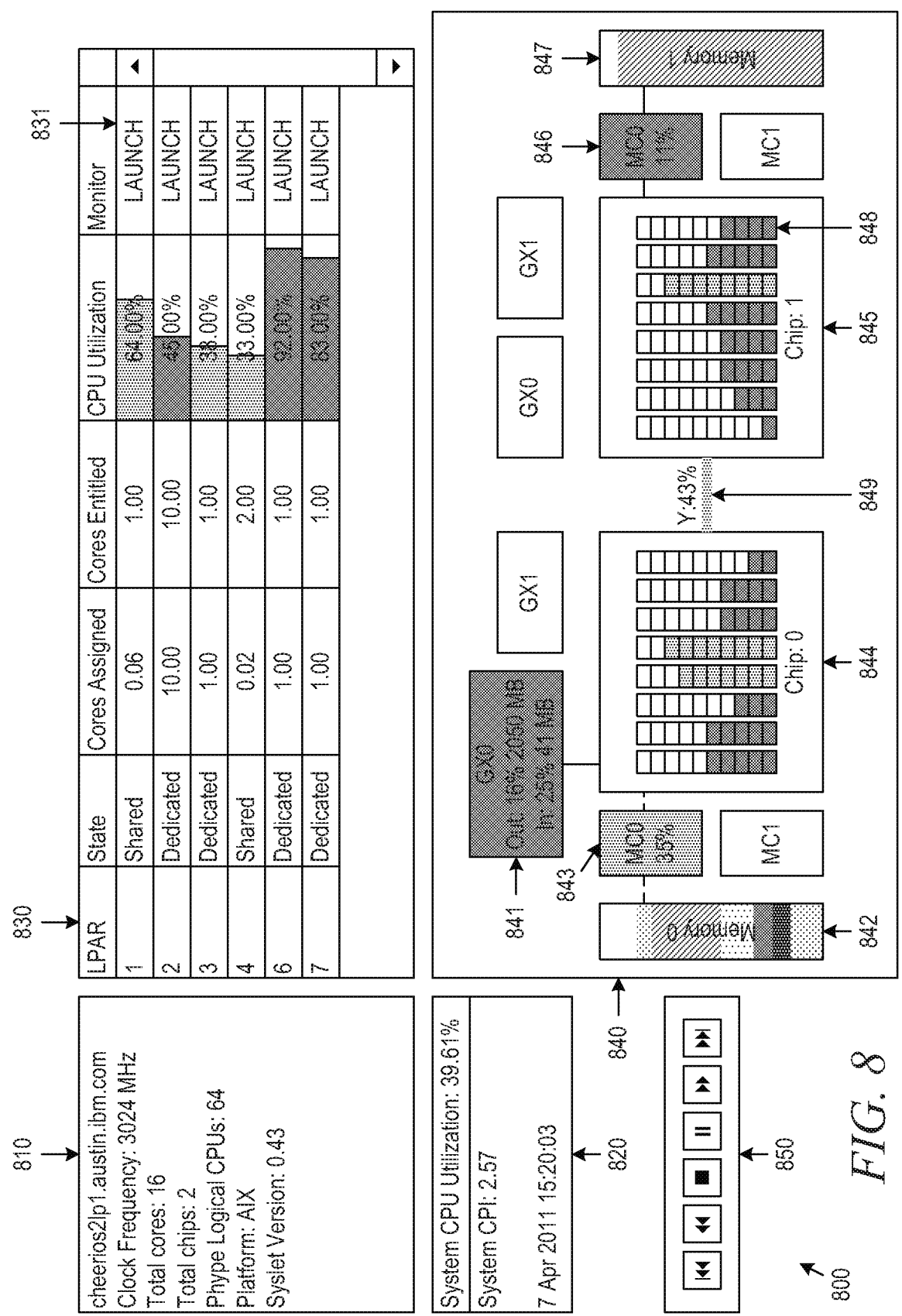
FIG. 8 depicts an example graphical user interface with a single node view in accordance with an illustrative embodiment.

FIG. 8 depicts an example graphical user interface with a single node view in accordance with an illustrative embodiment. Graphical user interface (GUI) display 800 comprises node information display portion 810, node utilization display portion 820, logical partition (LPAR) display portion 830, and physical topology display portion 840. Node information display portion 810 presents information about the node, such as clock frequency, number of processing cores, number of chips, number of logical processors, etc. Node utilization display portion 820 presents data about overall node utilization.

LPAR display portion 830 presents logical partitions (LPARs) in a table format. Logical partition display portion 830 displays for each LPAR allocated to the node an identifier of the LPAR, a state of the LPAR (shared or dedicated), a number of cores assigned to the LPAR, a number of cores entitled by the LPAR, real-time processor utilization of the LPAR, and a monitor launch control 831. Responsive to a user selecting a monitor launch control 831 for a given LPAR, the GUI application opens a single partition view, as will be described below.

Physical topology display portion 840 presents a node of the system in a topological format. Physical display portion 840 displays the chips in the node, the memories, memory controllers, and input/output interfaces. In the depicted example, the node includes chips 844, 845. Chip 844 connects to memory 842 via memory controller 843 and to I/O adapter 841. Chip 844 connects to node 845 via bus 849. Chip 845 connects to memory 847 via memory controller 846.

In one example embodiment, in response to a user selecting an LPAR in LPAR display portion 830, the GUI application may highlight the chip(s) or core(s) in physical topology display portion 840 the LPAR uses. Similarly, in response to a user selecting a chip or core in physical topology display portion 840, the GUI application may highlight the LPAR(s) that use the selected chip or core in LPAR display portion 830.

Memory display portion 842 may represent a physical memory device and portray percentages of memory utilization by the various LPARs in the system via different colors or shading. Memory controller display portions 843 may represent a physical memory controller and portray memory utilization as a numeric percentage in the depicted example. Chip display portions 844, 845 may represent a physical chip with a plurality of processing cores. Chip display portion 845, for example, may include core display portion 848, which may portray utilization in bar graph form by shading or coloring the percentage of the portion corresponding to measured utilization. Chip display portions 844, 845 may color or shade the utilization percentage of the cores differently based on whether utilization is high or low relative to one or more predetermined thresholds, presenting a relative "heat." I/O adapter portion 841 portrays incoming and outgoing bus utilization as a numeric percentage and throughput. Bus display portion 849 may represent bus utilization as a numeric percentage and may also color or shade the bus based on whether utilization is high or low relative to one or more predetermined thresholds, presenting a relative "heat." Physical topology display portion 840 may update utilization data in display portions 841-849 periodically to present a real-time display.

The system may record the real-time display information in a manner similar to a digital video recorder. The GUI displays of the illustrative embodiments may also comprise digital recorder-like controls. For example, GUI display 800 comprises controls 850, which allow the user to rewind, stop, pause, and fast forward the real time display. The GUI displays may also include controls for modifying CPU colors, bus colors, showing/hiding inactive buses, showing/hiding overlays, showing/hiding memory, and so forth.

Figure 9:
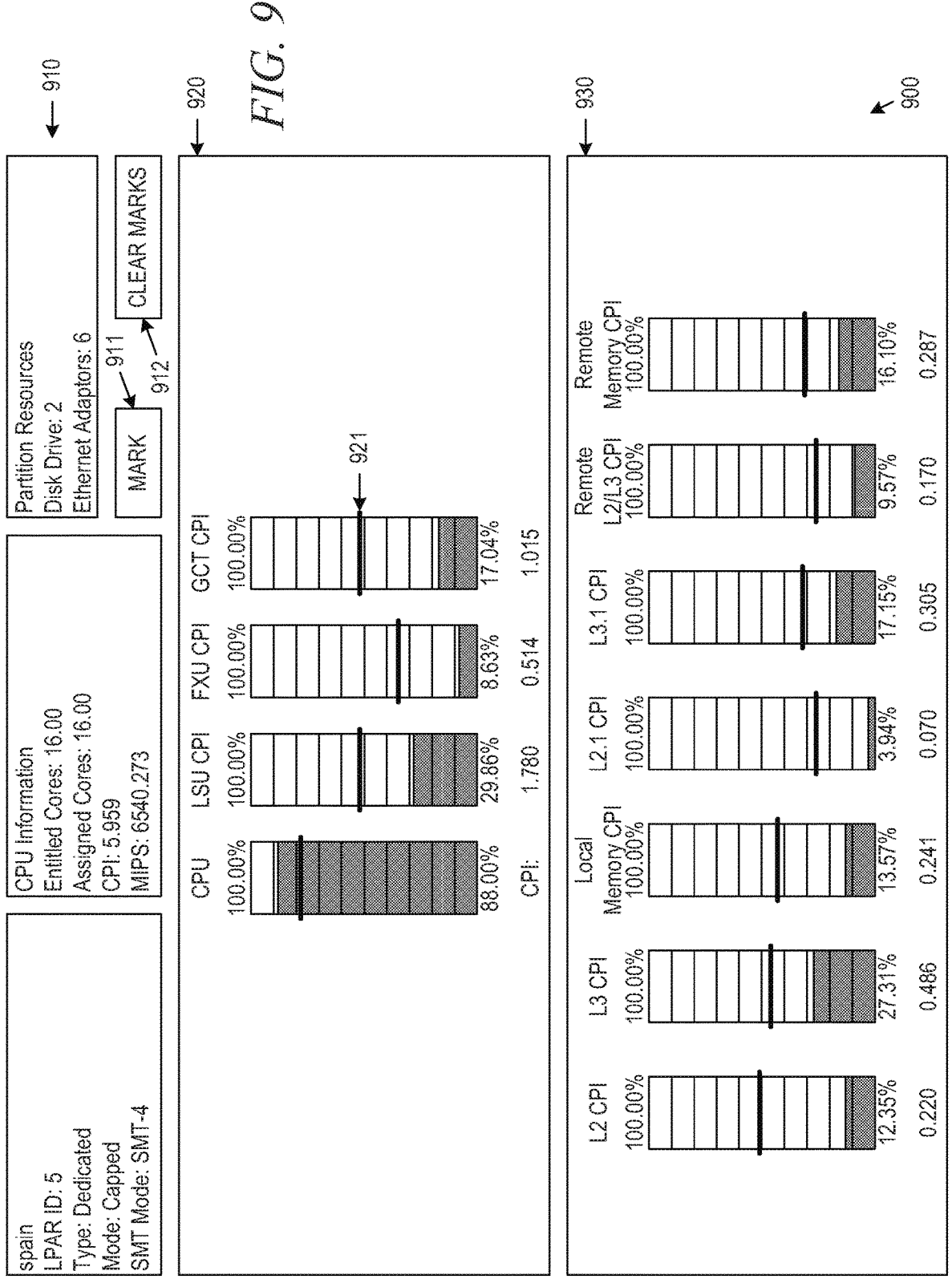
FIG. 9 depicts an example graphical user interface with a logical partition view in accordance with an illustrative embodiment.

FIG. 9 depicts an example graphical user interface with a logical partition view in accordance with an illustrative embodiment. Graphical user interface (GUI) display 900 comprises LPAR information display portion 910, overall cycles per instruction (CPI) display portion 920, and processor unit CPI display portion 930. LPAR information display portion 910 presents information about the LPAR, such as LPAR identifier, type, mode, entitled cores, assigned cores, overall CPI, millions of instructions per second (MPIPs), partition resources, etc.

Overall CPI display portion 920 may represent central processor unit (CPU) CPI, load/store unit (LSU) CPI, floating point unit (FXU) CPI, and global completion table (GCT) CPI as bar form by shading or coloring the percentage of the portion corresponding to measured utilization. Overall CPI display portion 920 may color or shade the CPI graphs differently based on whether CPI is high or low relative to one or more predetermined thresholds, presenting a relative "heat."

The GUI application may add additional functional unit CPI information with each exploding into a further breakdown for that particular unit. Additionally, although not shown here, the GUI application may show CPI information for network utilization, disk utilization, memory utilization, etc. for the partition. The GUI application may show a power hypervisor (PHYP) dispatch trace information graph, plotted in a variety of formats, including a scatter plot of which logical CPUs are dispatched to which partitions and how often. This would show an affinitized grouping. Also, for each partition, the GUI application may capture PHYP home node and memory allocation data. This may show how memory is allocated across the entire system for each partition, as well as which node is the home node for that partition.

In one example embodiment, in response to a user selecting a CPI graph, such as the LSU CPI graph in overall CPI display portion 920, the GUI application may present processor unit CPI display portion 930. In the depicted example, processor unit CPI display portion 930 presents CPI data for the LSU. Processor unit CPI display portion 930 presents L2 cache CPI, L3 cache CPI, local memory CPI, L2.1 CPI, L3.1 CPI, remote L2/L3 CPI, and remote memory CPI. Thus, processor unit CPI display portion 930 presents a very specific breakdown for CPI by allowing the user to perform "drill-through" to a selected LPAR and even a specific processor unit.

GUI display 900 also comprises "mark" button 911 and "clear marks" button 912. In response to a user selecting mark button 911, the GUI application places a mark, such as mark 921, at the current CPI levels. Thus, as the CPI levels change in the real-time view, the user can easily compare the levels to the marked levels. In response to the user selecting clear marks button 912, the GUI application removes the marks from the display. The GUI application may use the mark feature in other displays, such as with core utilization in GUI display 800, for example.

GUI display 900 represents a small sample of what could be shown for each partition. In addition to the existing per-partition performance data that exists today for a partition, this top-level LPAR view could be expanded further to allow lower-level drill-down of various performance issues. For example, if the LSU CPI is high and further indicates a high remote memory CPI component, various additional partition level tools may be run to collect execution profiles and show which applications are responsible for the loads and/or stores that are hitting remote memory. This tool may hierarchically take the user from the top level system view of bus/core utilization down to the specific instruction and data addresses in specific processes that are causing performance issues. As another example, high I/O adapter bus utilization may be further expanded in the LPAR view by showing various network and disk utilizations.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 10:
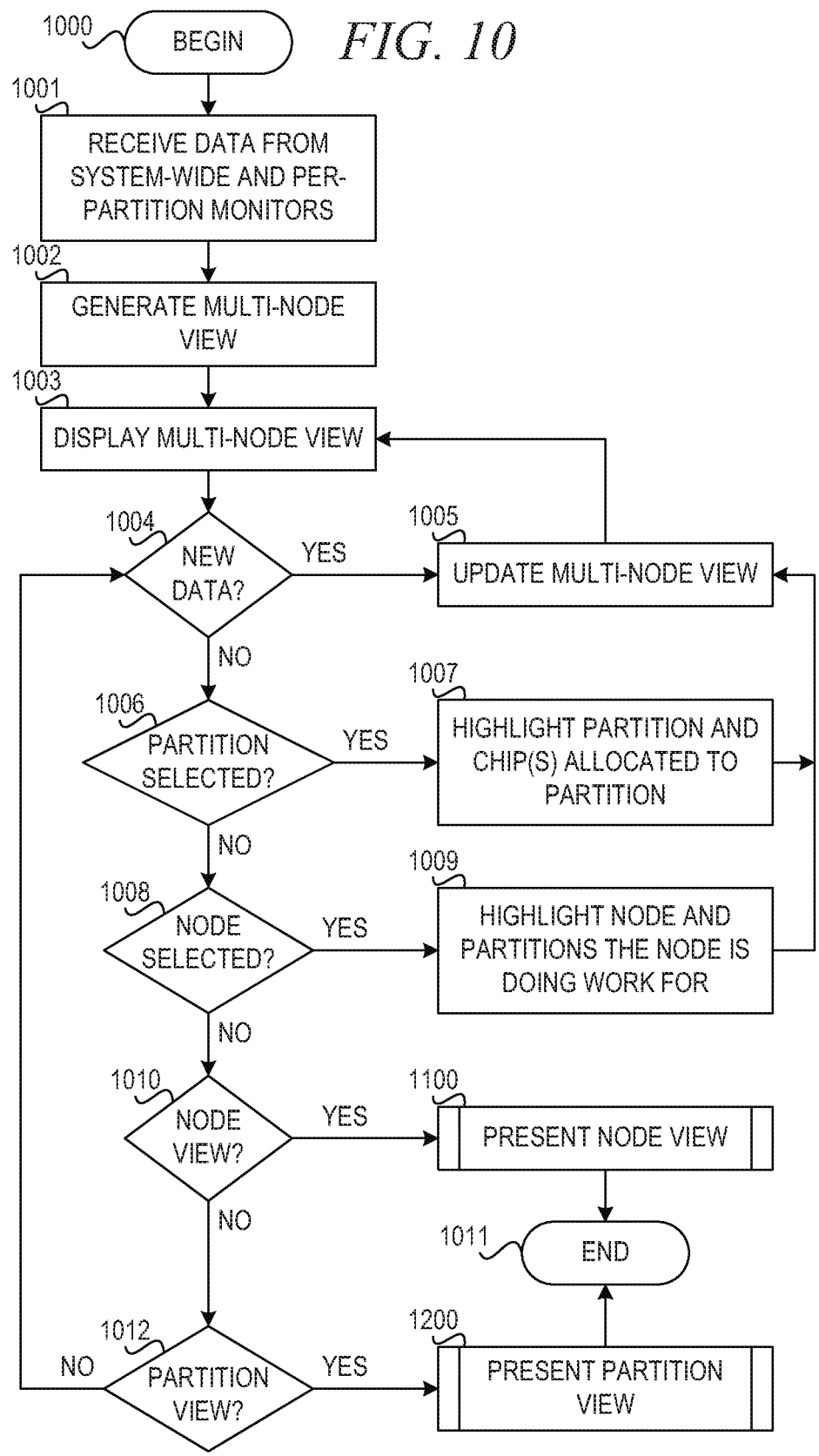
FIG. 10 is a flowchart illustrating operation of a performance monitoring graphical user interface mechanism for presenting a multi-node view in accordance with an illustrative embodiment in accordance with an illustrative embodiment.

FIG. 10 is a flowchart illustrating operation of a performance monitoring graphical user interface mechanism for presenting a multi-node view in accordance with an illustrative embodiment in accordance with an illustrative embodiment. Operation begins at 1000, and the mechanism receives data from a system-wide performance monitor and per-partition performance monitors (block 1001). The mechanism then generates a multi-node view (block 1002) with logical and physical views with real-time performance and utilization information. The mechanism displays the multi-node view (block 1003) and determines whether new data is received from the system-wide monitor or at least one of the per-partition monitors (block 1004).

If the mechanism receives new data, the mechanism updates the multi-node view to update the real-time performance and utilization information (block 1005), and operation returns to block 1003 to display the multi-node view. If the mechanism does not receive new data in block 1004, the mechanism determines whether a logical partition (LPAR) is selected by a user (block 1006). If a user selects an LPAR, the mechanism highlights the partition and node(s) and chip(s) allocated to the partition (block 1007). Then, operation returns to block 1005 to update the multi-node view and then returns to block 1003 to display the multi-node view. If a user does not select an LPAR in block 1006, the mechanism determines whether a user selects a node (block 1008). If a user selects a node in block 1008, the mechanism highlights the node and the LPAR(s) the node is doing work for (block 1009). Then, operation returns to block 1005 to update the multi-node view and then returns to block 1003 to display the multi-node view. In an alternative embodiment, a user may select other physical components, such as memory, memory controller, I/O adapter, bus, etc., and the mechanism may highlight the LPAR(s) the selected component is doing work for.

If a user does not select a node or other physical component in block 1008, the mechanism determines whether a user launches a node view (block 1010). In one example embodiment, a user may "drill down" to a node from the multi-node view by double clicking on a node or by selecting a node and then selecting a "launch" button. If a user launches a node view, the mechanism presents the node view (block 1100), and operation ends 1011. The operation of presenting the node view is described in further detail below with respect to FIG. 11.

If a user does not launch the node view in block 1010, the mechanism determines whether the user launches a partition view (block 1012). In one example embodiment, a user may "drill down" to an LPAR from the multi-node view by double clicking on an LPAR or by selecting a "launch" button associated with the LPAR. If the user launches the partition view, the mechanism presents the partition view (block 1200), and operation ends. The operation of presenting the partition view is described in further detail below with respect to FIG. 12. If a user does not launch the partition view in block 1012, operation returns to block 1004 to determine whether new data is received.

Figure 11:
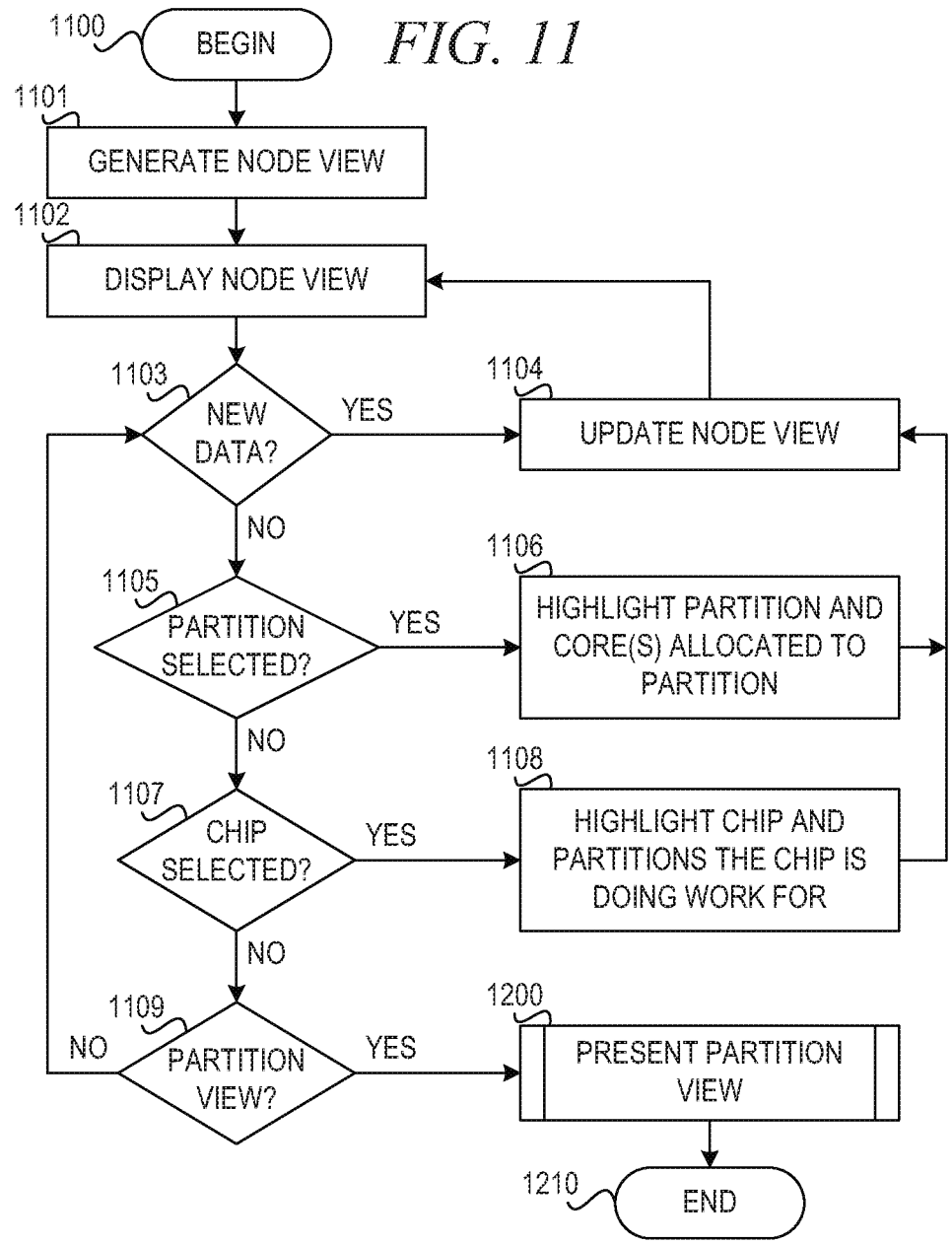
FIG. 11 is a flowchart illustrating operation of a performance monitoring graphical user interface mechanism for presenting a single node view in accordance with an illustrative embodiment.

FIG. 11 is a flowchart illustrating operation of a performance monitoring graphical user interface mechanism for presenting a single node view in accordance with an illustrative embodiment. Operation begins at 1100, and the mechanism generates a single node view (block 1101) with logical and physical views with real-time performance and utilization information. The mechanism displays the single node view (block 1102) and determines whether new data is received from the system-wide monitor or at least one of the per-partition monitors (block 1103).

If the mechanism receives new data, the mechanism updates the single node view to update the real-time performance and utilization information (block 1104), and operation returns to block 1102 to display the single node view. If the mechanism does not receive new data in block 1103, the mechanism determines whether a logical partition (LPAR) is selected by a user (block 1105). If a user selects an LPAR, the mechanism highlights the partition and chip(s) and core(s) allocated to the partition (block 1106). Then, operation returns to block 1104 to update the single node view and then returns to block 1102 to display the single node view. If a user does not select an LPAR in block 1105, the mechanism determines whether a user selects a chip (block 1107). If a user selects a chip in block 1107, the mechanism highlights the chip and the LPAR(s) the chip is doing work for (block 1108). Then, operation returns to block 1104 to update the single node view and then returns to block 1102 to display the single node view. In an alternative embodiment, a user may select other physical components, such as memory, memory controller, I/O adapter, bus, etc., and the mechanism may highlight the LPAR(s) the selected component is doing work for.

If a user does not select a chip or other physical component in block 1107, the mechanism determines whether a user launches a partition view (block 1109). In one example embodiment, a user may "drill down" to an LPAR from the multi-node view by double clicking on an LPAR or by selecting a "launch" button associated with the LPAR. If the user launches the partition view, the mechanism presents the partition view (block 1200), and operation ends 1210. The operation of presenting the partition view is described in further detail below with respect to FIG. 12. If a user does not launch the partition view in block 1109, operation returns to block 1103 to determine whether new data is received.

FIG. 12 is a flowchart illustrating operation of a performance monitoring graphical user interface mechanism for presenting a partition view in accordance with an illustrative embodiment. Operation begins at 1200, and the mechanism generates a partition view (block 1201) with real-time processing unit cycles per instruction (CPI) information. The mechanism displays the partition view (block 1202) and determines whether new data is received from the system-wide monitor or at least one of the per-partition monitors (block 1203).

If the mechanism receives new data, the mechanism updates the partition view to update the real-time CPI information (block 1204), and operation returns to block 1202 to display the partition view. If the mechanism does not receive new data in block 1203, the mechanism determines whether a user selects a control to mark CPI levels (block 1205). If the user selects a control to mark CPI levels, the mechanism marks the current CPI levels in the partition view (block 1206). Then, operation returns to block 1204 to update the partition view and then returns to block 1202 to display the partition view.

If a user does not select a control to mark CPI levels in block 1205, the mechanism determines whether a user selects a control to clear marks (block 1207). If the user selects a control to clear marks, the mechanism clears marks in the partition view (block 1208). Then, operation returns to block 1204 to update the partition view and then returns to block 1202 to display the partition view. If a user does not select a control to clear marks in block 1207, operation returns to block 1203 to determine whether new data is received.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for providing a graphical user interface tool for system-wide topology and performance monitoring with per-partition views. A graphical user interface application presents a consolidated view of physical and logical information based on the received performance data. The mechanisms provide real-time performance and utilization information in a visual format relative to the physical components in a topographical layout. The user may drill down to lower levels to view more detailed performance and utilization information.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performance monitoring, the method comprising:

receiving performance and utilization data from a system-wide monitor for a central electronics complex and a plurality of per-partition monitors within a plurality of logical partitions executing within the central electronics complex;

generating a graphical user interface comprising a logical display portion and a physical display portion, wherein the logical display portion consolidates a visual representation of logical partition data and a visual representation of physical resource utilization data from the performance and utilization data for each of the plurality of logical partitions, wherein the physical display portion consolidates a physical topology representation of at least a portion of the central electronics complex and a visual representation of physical resource utilization data by the plurality of logical partitions;

presenting the graphical user interface on a presentation device of the data processing system;

responsive to a user launching a single node view for a selected node within the central electronics complex, generating a single node graphical user interface and presenting the single node graphical user interface on a presentation device of the data processing system, wherein the selected node comprises a plurality of physical components;

responsive to a user launching a drill-down view for a selected physical component within the selected node, generating a drill-down graphical user interface comprising a logical display portion and a physical display portion, wherein the logical display portion consolidates logical partition data and physical resource utilization data that corresponding to a subset of the plurality of logical partitions the selected physical component does work for, wherein the physical display portion consolidates a physical topology representation of the selected physical component and represents physical resource utilization data by the subset of the plurality of logical partitions; and presenting the drill-down graphical user interface on the presentation device of the data processing system.

2. The method of claim 1, wherein receiving the performance and utilization data comprises periodically receiving the performance and utilization data from the system-wide monitor and the plurality of per-partition monitors, the method further comprising:
periodically updating the graphical user interface such that the logical display portion and the physical display portion present real-time physical resource utilization data.

3. The method of claim 1, further comprising:
responsive to a user selecting a physical component of the central electronics complex within the physical topology representation in the physical display portion of the graphical user interface, highlighting a subset of the plurality of logical partitions that the physical component does work for.

4. The method of claim 1, further comprising:
responsive to a user selecting a logical partition within the logical display portion of the graphical user interface, highlighting at least one physical component within the central electronics complex that does work for the selected logical partition.

5. The method of claim 1, wherein the selected physical component is one of a chip, a processing core, an input/output adapter, a memory controller, a memory, or a bus.

6. The method of claim 1, further comprising:
responsive to a user launching a partition view for a selected partition within the plurality of logical partitions, generating a partition view graphical user interface comprising a cycles per instruction display portion, wherein the cycles per instruction display portion comprises a visual representation of a cycles per instruction value for at least one processing unit; and
presenting the partition view graphical user interface on a presentation device of the data processing system.

7. The method of claim 6, the method further comprising:
responsive to the user selecting a mark control, marking a current cycles per instruction value for the at least one processing unit.

8. The method of claim 6, wherein generating the partition view graphical user interface comprises color coding each visual representation of a cycles per instruction value based on whether the cycles per instruction value is above or below at least one predetermined threshold.

9. The method of claim 6, further comprising:
responsive to a user launching a drill-down view for a selected processing unit within the at least one processing unit, generating a partition view graphical user interface comprising a cycles per instruction display portion, wherein the cycles per instruction display portion comprises a visual representation of a cycles per instruction value for selected processing unit; and
presenting the drill-down view graphical user interface on a presentation device of the data processing system.

10. The method of claim 1, wherein generating the graphical user interface comprises color coding each visual representation of physical resource utilization data based on whether utilization is above or below at least one predetermined threshold.

11. A computer program product comprising a computer readable storage medium having a computer readable program stored therein, wherein the computer readable program, when executed on a computing device, causes the computing device to:
receive performance and utilization data from a system-wide monitor for a central electronics complex and a plurality of per-partition monitors within a plurality of logical partitions executing within the central electronics complex;
generate a graphical user interface comprising a logical display portion and a physical display portion, wherein the logical display portion consolidates a visual representation of logical partition data and a visual representation of physical resource utilization data from the performance and utilization data for each of the plurality of logical partitions, wherein the physical display portion consolidates a physical topology representation of at least a portion of the central electronics complex and a visual representation of physical resource utilization data by the plurality of logical partitions;
present the graphical user interface on a presentation device of the data processing system;
responsive to a user launching a single node view for a selected node within the central electronics complex, generate a single node graphical user interface and present the single node graphical user interface on a presentation device of the data processing system, wherein the selected node comprises a plurality of physical components;
responsive to a user launching a drill-down view for a selected physical component within the selected node, generate a drill-down graphical user interface comprising a logical display portion and a physical display portion, wherein the logical display portion consolidates logical partition data and physical resource utilization data that corresponding to a subset of the plurality of logical partitions the selected physical component does work for, wherein the physical display portion consolidates a physical topology representation of the selected physical component and represents physical resource utilization data by the subset of the plurality of logical partitions; and
present the drill-down graphical user interface on the presentation device of the data processing system.

12. The computer program product of claim 11, wherein receiving the performance and utilization data comprises periodically receiving the performance and utilization data from the system-wide monitor and the plurality of per-partition monitors, wherein the computer readable program further causes the computing device to:
periodically update the graphical user interface such that the logical display portion and the physical display portion present real-time physical resource utilization data.

13. The computer program product of claim 11, wherein the computer readable program further causes the computing device to:
responsive to a user launching a partition view for a selected partition within the plurality of logical partitions, generate a partition view graphical user interface comprising a cycles per instruction display portion, wherein the cycles per instruction display portion comprises a visual representation of a cycles per instruction value for at least one processing unit; and
present the partition view graphical user interface on a presentation device of the data processing system.

14. The computer program product of claim 11, wherein the computer readable program is stored in a computer readable storage medium in a data processing system and wherein the computer readable program was downloaded over a network from a remote data processing system.

15. The computer program product of claim 11, wherein the computer readable program is stored in a computer readable storage medium in a server data processing system and wherein the computer readable program is downloaded over a network to a remote data processing system for use in a computer readable storage medium with the remote system.

16. The computer program product of claim 11, wherein the selected physical component is one of a chip, a processing core, an input/output adapter, a memory controller, a memory, or a bus.

17. An apparatus, comprising:
a processor; and
a memory coupled to the processor, wherein the memory comprises instructions which, when executed by the processor, cause the processor to:
receive performance and utilization data from a system-wide monitor for a central electronics complex and a plurality of per-partition monitors within a plurality of logical partitions executing within the central electronics complex;
generate a graphical user interface comprising a logical display portion and a physical display portion, wherein the logical display portion consolidates a visual representation of logical partition data and a visual representation of physical resource utilization data from the performance and utilization data for each of the plurality of logical partitions, wherein the physical display portion consolidates a physical topology representation of at least a portion of the central electronics complex and a visual representation of physical resource utilization data by the plurality of logical partitions;
present the graphical user interface on a presentation device of the data processing system;
responsive to a user launching a single node view for a selected node within the central electronics complex, generate a single node graphical user interface and present the single node graphical user interface on a presentation device of the data processing system, wherein the selected node comprises a plurality of physical components;
responsive to a user launching a drill-down view for a selected physical component within the selected node, generate a drill-down graphical user interface comprising a logical display portion and a physical display portion, wherein the logical display portion consolidates logical partition data and physical resource utilization data that corresponding to a subset of the plurality of logical partitions the selected physical component does work for, wherein the physical display portion consolidates a physical topology representation of the selected physical component and represents physical resource utilization data by the subset of the plurality of logical partitions; and
present the drill-down graphical user interface on the presentation device of the data processing system.

18. The apparatus of claim 17, wherein receiving the performance and utilization data comprises periodically receiving the performance and utilization data from the system-wide monitor and the plurality of per-partition monitors, wherein instructions further cause the processor to:
periodically update the graphical user interface such that the logical display portion and the physical display portion present real-time physical resource utilization data.

19. The apparatus of claim 17, wherein instructions further cause the processor to:
responsive to a user launching a partition view for a selected partition within the plurality of logical partitions, generate a partition view graphical user interface comprising a cycles per instruction display portion, wherein the cycles per instruction display portion comprises a visual representation of a cycles per instruction value for at least one processing unit; and
present the partition view graphical user interface on a presentation device of the data processing system.

20. The apparatus of claim 17, wherein the selected physical component is one of a chip, a processing core, an input/output adapter, a memory controller, a memory, or a bus.

* * * * *